(12) United States Patent
Meunier et al.

(10) Patent No.: US 8,897,935 B2
(45) Date of Patent: Nov. 25, 2014

(54) METHOD AND DEVICE FOR AIRCRAFT, FOR AVOIDING COLLISION WITH THE TERRAIN

(75) Inventors: Hugues Meunier, Frouzins (FR); Nicolas Marty, Saint Sauveur (FR); Julia Percier, Cugnaux (FR)

(73) Assignee: Thales, Neuilly-sur-Seine (FR)

( * ) Notice: Subject to any disclaimer, the term of this patent is extended or adjusted under 35 U.S.C. 154(b) by 1237 days.

(21) Appl. No.: 12/440,513

(22) PCT Filed: Aug. 29, 2007

(86) PCT No.: PCT/EP2007/058979
§ 371 (c)(1),
(2), (4) Date: Mar. 9, 2009

(87) PCT Pub. No.: WO2008/031723
PCT Pub. Date: Mar. 20, 2008

(65) Prior Publication Data
US 2010/0042273 A1  Feb. 18, 2010

(30) Foreign Application Priority Data

Sep. 12, 2006  (FR) ...................................... 06 07961

(51) Int. Cl.
| G06F 7/00 | (2006.01) |
| G08G 5/00 | (2006.01) |
| G01C 23/00 | (2006.01) |
| G05D 1/06 | (2006.01) |
| G08G 5/04 | (2006.01) |

(52) U.S. Cl.
CPC ............ G01C 23/005 (2013.01); G08G 5/0086 (2013.01); G05D 1/0676 (2013.01); G08G 5/045 (2013.01)
USPC ............ 701/9; 701/3; 701/8; 701/10; 701/16; 701/17; 701/301; 340/947; 340/948; 340/951; 340/954; 340/960; 340/961; 340/967; 340/976; 340/979; 342/29; 342/36; 342/65; 342/455

(58) Field of Classification Search
USPC ........ 701/3, 8–10, 16–17, 301; 340/947–948, 340/951, 954, 960–961, 967, 976, 979; 342/29, 36, 65, 455
See application file for complete search history.

(56) References Cited

U.S. PATENT DOCUMENTS

| 5,414,631 A | 5/1995 | Denoize et al. |
| 5,488,563 A | 1/1996 | Chazelle et al. |

(Continued)

FOREIGN PATENT DOCUMENTS

| EP | 0 790 487 A2 | 8/1997 |
| FR | 2 813 963 | 3/2002 |

(Continued)

*Primary Examiner* — Helal A Algahaim
*Assistant Examiner* — Kelly E Darby
(74) *Attorney, Agent, or Firm* — Lowe Hauptman & Ham, LLP

(57) ABSTRACT

This disclosure relates to a system for preventing collisions with a terrain. The system includes a detecting means for detecting risks of collision with the terrain after a predetermined forecasting delay. The system further includes a determining means for determining, based on a trajectory followed by the aircraft, a possible limit point for success of the vertical terrain avoidance maneuver. The system further includes indication means for giving indications on azimuth clearance sections, around the direction in which the aircraft is moving, suitable for success of the vertical terrain avoidance maneuver. The system further includes means for estimating a free-travel distance in each azimuth clearance sector on a straight distancing trajectory with constant gradient and over a distance correspond to more than one minute of flight, the free-travel distance being free of potential conflicts with the terrain. The system further includes means for signaling azimuth clearance sections and free-travel distances.

17 Claims, 9 Drawing Sheets

(56) References Cited

U.S. PATENT DOCUMENTS

| | | | |
|---|---|---|---|
| 5,638,282 | A | 6/1997 | Chazelle et al. |
| 5,677,842 | A | 10/1997 | Denoize et al. |
| 5,864,307 | A * | 1/1999 | Henley .......................... 340/964 |
| 5,892,462 | A | 4/1999 | Tran |
| 6,088,654 | A | 7/2000 | Lepere et al. |
| 6,292,721 | B1 * | 9/2001 | Conner et al. .................... 701/9 |
| 6,317,663 | B1 | 11/2001 | Meunier et al. |
| 6,480,120 | B1 | 11/2002 | Meunier |
| 7,321,813 | B2 * | 1/2008 | Meunier ........................ 701/10 |
| 2001/0013836 | A1 * | 8/2001 | Cowie .......................... 340/961 |
| 2003/0107499 | A1 * | 6/2003 | Lepere et al. ................. 340/945 |
| 2004/0068372 | A1 * | 4/2004 | Ybarra et al. ................. 701/301 |
| 2004/0181318 | A1 * | 9/2004 | Redmond et al. ................. 701/9 |
| 2007/0185652 | A1 * | 8/2007 | Salmon et al. ............... 701/301 |

FOREIGN PATENT DOCUMENTS

| | | | |
|---|---|---|---|
| FR | 2 842 594 | 1/2004 | |
| FR | 2 848 661 | 6/2004 | |
| FR | 2 860 292 | 4/2005 | |
| FR | 2 864 270 | 6/2005 | |
| FR | 2 864 312 | 6/2005 | |
| FR | 2 867 851 | 9/2005 | |
| FR | 2 868 835 | 10/2005 | |
| FR | 2 871 878 | 12/2005 | |
| FR | 2 893 146 | 5/2007 | |
| WO | WO 02/21229 A2 | 3/2002 | |
| WO | WO-2004/055752 A1 * | 7/2004 | ............... G08G 5/04 |
| WO | WO-2005/069093 A1 * | 7/2005 | ............... G05D 1/06 |

* cited by examiner

METHOD AND DEVICE FOR AIRCRAFT, FOR AVOIDING COLLISION WITH THE TERRAIN

CROSS REFERENCE TO RELATED APPLICATIONS

The present Application is based on International Application No. PCT/EP2007/058979, filed on Aug. 29, 2007, which in turn corresponds to French Application No. 06 07961, filed on Sep. 12, 2006, and priority is hereby claimed under 35 USC §119 based on these applications. Each of these applications are hereby incorporated by reference in their entirety into the present application.

FIELD OF THE INVENTION

The present invention relates to the prevention of aeronautical accidents in which an aircraft that is maneuverable crashes into the ground and this, where appropriate, despite prior warnings and alarms.

BACKGROUND OF THE INVENTION

This type of accident, known in the technical literature by the acronym CFIT, deriving from the expression "Controlled Flight Into Terrain", was one of the main causes of transport aircraft accidents and of the number of people killed in recent years. However, thanks to concepts of signaling the risk of collision with the terrain and to the associated onboard systems known by the expression TAWS (Terrain Awareness & Alerting Systems), including in particular GCAS and T²CAS (developed and marketed by Thales) most of the accidents of this type are now avoided.

For more details on the concepts implemented in the TAWS systems, reference can profitably be made to the U.S. Pat. No. 5,488,563, U.S. Pat. No. 5,414,631, U.S. Pat. No. 5,638,282, U.S. Pat. No. 5,677,842, U.S. Pat. No. 6,088,654, U.S. Pat. No. 6,317,663, U.S. Pat. No. 6,480,120 and to the French patent applications FR 2.813.963, FR 2.842.594, FR 2.848661, FR 2.860.292, FR 2.864.270, FR 2.864.312, FR 2.867.851, FR 2.868.835.

The onboard systems for preventing risks of collision with the terrain that are currently in service are mostly based on a simple upward terrain avoidance maneuver of the so-called "Pull-Up" type, consisting of a full-throttle climb preceded by a leveling of the wings if the aircraft was turning and hereinafter called "standard avoidance maneuver" or "standard avoidance trajectory".

However, there are situations of risk of collision with the terrain that cannot be resolved by a simple upward avoidance maneuver of the "Pull-up" type. For example, when a risk of collision with the ground occurs when the aircraft is turning along significant relief, even when the aircraft is directed in a straight line towards reliefs that are significantly higher, that cannot be crossed given the climb capabilities of the airplane. These situations are signaled by the most advanced TAWS systems (typically, the TAWS systems developed by Thales) by means of a specific "Avoid terrain" alarm that is different from the usual "Pull-up" alarm, but without indication of an avoidance trajectory making it possible to clear the dangerous situation. The crew, which is in a dangerous situation that it cannot get out of by a simple upward avoidance maneuver, must urgently decide, often in the absence of visibility and only with sight of the threatening reliefs appearing on the navigation screen, on a change of heading opening up once again the possibility of an upward avoidance of the relief.

The provision of an indication of the best avoidance trajectory or trajectories to be taken when there is a proven risk of collision with the terrain is therefore necessary to further improve the TAWS systems.

Moreover, since the crew can often be in situations where it is not fully aware of the imminence of the danger and where it delays the avoidance maneuver, it is highly desirable, over and above indications on the best avoidance trajectory or trajectories to be taken, for the avoidance trajectory to be able to be automated.

It should be noted that there are onboard certain military airplanes terrain following systems which automatically avoid the relief and the obstacles on the ground, but the operational objectives are fundamentally different from those of the TAWS systems intended for transport aircraft.

Indeed, the aim of the terrain following function is to keep a fighter airplane as long as possible close to the ground, at a predetermined height, in order to have it not seen by hostile forces. Each time that a risk of collision with the ground occurs, this function undertakes an avoidance maneuver of the smallest possible amplitude to remain glued to the terrain. In the case of transport aircraft, helicopters and even drones for certain missions, the operational objective is not to remain glued to the terrain but to follow trajectories programmed manually or automatically, via a flight management computer (FMS) or an automatic pilot PA, as much as possible avoiding any significant alteration of this trajectory, except to avoid the relief presenting proven risks of collision. For such aircraft, the initiation of a relief avoidance maneuver must be undertaken only in the presence of a proven risk, and as infrequently as possible in order to reduce the forces on the airframe and to respect the comfort of the passengers. Applying logics that are acceptable for fighter airplanes is absolutely not appropriate to the case of the transport aircraft considered here.

Also known, from the U.S. Pat. No. 5,892,462, is a TAWS system that uses a modeling of the behavior of the aircraft to generate a protection volume linked to the aircraft and to plot avoidance trajectories that are practicable for the aircraft. The protection volume surrounds an extrapolation of the current trajectory of the aircraft extended by a climb trajectory prediction. Its penetration by the terrain is likened to a risk of collision with the terrain. In case of proven risk of collision with the terrain, the system works back step by step through the current trajectory extrapolation to determine the limit point of the trajectory of the aircraft up to which a purely vertical avoidance maneuver can be successfully applied. When the limit point is passed or can no longer be determined, the system then initiates a search for a practicable lateral avoidance trajectory by an angular scanning of the terrain profiles, either side of the current trajectory of the aircraft.

This TAWS system gives a warning when the limit point for application of a purely vertical avoidance maneuver is passed and emits an alarm when it appears that it will no longer be possible to find a lateral avoidance trajectory. It addresses the concerns of a better assistance to a crew confronted with the need to execute a lateral avoidance maneuver because it is also capable of acting on the flight director to guide the pilot in the following of a lateral avoidance trajectory or on the automatic pilot to execute a lateral avoidance trajectory. This system, which does not appear to be operational at the present time, presents the drawback of using a modeling of the dynamic behavior of the aircraft which is complex to implement and poses major problems of certification with a view to operational implementation because the level of precision of this behavioral modeling affects the dependability of the TAWS system itself. In its search for the first possible way out from a short-term risk of collision with the terrain, it also has the drawback of not being concerned with minimizing the alterations made to the initial trajectory and the medium-term risks of collision with the terrain. Moreover, this search is initiated only after the limit point for a purely vertical avoidance maneuver has been passed, which limits its application to situations where the airplane is normally behind this limit point without running into any danger with the relief, for example in the case of a turn at low height close to high reliefs.

The applicant has also proposed, in a French patent application filed under the number 05 11457 on 10 Nov. 2005, a terrain avoidance system for transport aircraft that accompanies the alarms of "Avoid terrain" type indicating to the pilot that he has passed the limit point for success of a standard vertical avoidance maneuver, or complementary indications such as the azimuth sectors suitable for a clearance maneuver or a predefined clearance trajectory, or an automatic engagement of a predefined avoidance trajectory. This system implements, for the determination of the limit point, the monitoring of a penetration of a model of the terrain being flown over in a first protection volume linked to the aircraft and configured to model a standard vertical avoidance maneuver trajectory executed without delay, said trajectory being advantageously predefined according to parameters such as the type of the aircraft, its weight and even its inertia or climb delay, and for the determination of the clearance azimuth sectors, an analysis of the penetrations of the model of terrain being flown over in a second protection volume with large azimuth aperture, linked to the aircraft and configured to contain the limit point protection volume and, for the different azimuths covered, to model the trajectories of a compound maneuver beginning with change-of-heading maneuvers making it possible to reach the azimuth concerned and continuing with the standard vertical terrain avoidance maneuver, said trajectories being, in their parts corresponding to the standard vertical avoidance maneuver, predefined advantageously according to parameters such as the type of the aircraft, its weight and even its inertia or climb delay.

SUMMARY OF THE INVENTION

One object of the present invention is an embedded system on board aircraft, informing the crew of an aircraft on its possibilities of changing route to safely resolve a conflict with the terrain and avoid as far as possible other subsequent potential conflicts with the terrain, by giving indications on the instant of initiation, manually or automatically, of an avoidance maneuver in case of proven risk of collision with the terrain and indications on the avoidance maneuver to be performed, manually or automatically, to avoid this proven risk of collision.

Another object of the invention is to facilitate, for the crew of an aircraft, the choice of an avoidance trajectory that resolves a current conflict with the terrain in the safest way, while having the lowest possible cost regarding the alterations of the route and the slope of the trajectory initially followed.

Yet another object of the invention is a system for preventing collisions with the terrain that provides the crew of an aircraft with assistance for the determination and/or the following of an avoidance trajectory able to resolve a current conflict with the terrain, that can be obtained by a simple upgrading of the existing TAWS systems, or that can be associated with existing TAWS systems.

The invention is directed to a system for preventing collisions with the terrain:

detecting the risks of collision with the terrain after a predetermined forecasting delay, by likening them to the penetration of a topographic representation of the terrain being flown over stored in a database accessible to the aircraft, in a protection volume linked to the aircraft located relative to the terrain being flown over by means of an onboard locating equipment item, oriented in the direction in which the aircraft is moving and configured in such a way as to model a standard vertical terrain avoidance maneuver trajectory undertaken over the forecasting delay from the trajectory followed by the aircraft predicted from flight information delivered by flight equipment of the aircraft, determining, on the trajectory followed by the aircraft, a possible limit point for success of a standard vertical terrain avoidance maneuver, by likening the crossing by the aircraft of this limit point to the penetration of the terrain into a protection volume linked to the aircraft and configured in such a way as to model a standard vertical avoidance maneuver trajectory executed without delay, said trajectory being predefined as a function of specific parameters of the aircraft concerned, and giving indications on the azimuth clearance sectors, on either side of the direction in which the aircraft is moving, suitable for the success of a standard vertical terrain avoidance maneuver, by likening the azimuth clearance sectors to the azimuth sectors free of penetration of the terrain into a protection volume with large azimuth aperture, linked to the aircraft and configured in such a way as to contain the limit point protection volume and, for the different azimuths covered, a modeling of the trajectories of a compound maneuver beginning with change-of-heading maneuvers making it possible to reach the azimuth concerned and continuing with the standard vertical terrain avoidance maneuver, said trajectories being, on their parts corresponding to the standard vertical avoidance maneuver, predefined as a function of specific parameters of the aircraft said system comprising:

means for estimating free-travel distance to estimate, in each azimuth clearance sector, on a distancing trajectory with arbitrary configuration and over a distance corresponding to several minutes of flight, a free-travel distance free of potential conflict with the terrain, and means for signaling azimuth clearance sectors with their free-travel distances.

In case of current conflict with the terrain that cannot be resolved by a standard vertical avoidance maneuver, the signaling of the clearance azimuth sectors enables the crew of an aircraft to know the possible changes of route, the preference of the crew naturally tending towards the most open sectors without prejudging possible medium-term conflicts with the terrain not taking into account, because they are beyond the range of the protection volume used for the determination of the clearance sectors. The signaling for each clearance sector of their free-travel distance gives the crew additional information on the potential medium-term conflicts that it risks being faced with by trying to resolve a current conflict with the terrain. The crew is thus better armed to choose the most safe avoidance trajectory.

Advantageously, the means for estimating free-travel distance determine, on the distancing trajectories, possible limit points for success of a standard vertical avoidance maneuver marking the limit of a free-travel distance.

Advantageously, the means for estimating free-travel distance determine, on the distancing trajectories, possible points of initiation of a vertical avoidance maneuver with arbitrary slope, less than that of a standard vertical avoidance maneuver, said initiation points being taken as the limit of an immediate free-travel distance.

Advantageously, the distancing trajectory concerned in a clearance sector is a straight trajectory with constant slope.

Advantageously, the distancing trajectory concerned in a clearance sector is a horizontal straight trajectory.

Advantageously, the distancing trajectory concerned in a clearance sector is a straight trajectory reproducing the slope of the current trajectory of the aircraft.

Advantageously, the distancing trajectory concerned in a clearance sector is a climbing straight trajectory.

Advantageously, the compound maneuver used to generate the protection volume for the determination of the clearance sectors begins with a change-of-heading maneuver consisting in a turn in a horizontal plane.

Advantageously, the compound maneuver used to generate the protection volume for the determination of the clearance sectors begins with a change-of-heading maneuver consisting in a climbing turn.

Advantageously, the standard vertical avoidance maneuver concerned for the determination of the free-travel distances in the clearance sectors has its trajectory predefined as a function of the type of the aircraft and of its current climb capabilities.

Advantageously, the standard vertical avoidance maneuver concerned for the determination of the free-travel distances in the clearance sectors has its trajectory predefined as a function of the type of the aircraft and of its current configuration.

Advantageously, the system for preventing collisions with the terrain also comprises means for selecting a compound terrain avoidance maneuver minimizing the change of route and any conflicts in the medium term with the terrain.

Advantageously, the system for preventing collisions with the terrain also comprises means for displaying the selected compound terrain avoidance maneuver or maneuvers.

Advantageously, the system for preventing collisions with the terrain also comprises means for guiding the crew of the aircraft in the execution of a compound terrain avoidance maneuver.

Advantageously, the system for preventing collisions with the terrain also comprises means for automatically executing a compound terrain avoidance maneuver acting directly on the flight controls of the aircraft.

Advantageously, the system for preventing collisions with the terrain also comprises means for warning of the risk of collision in the medium term with the terrain that, in order to be resolved, involves a change of trajectory of the aircraft, on the part of the crew, likening a collision with the terrain to the penetration of the terrain into a warning protection volume linked to the aircraft that models a predefined standard vertical avoidance maneuver trajectory undertaken in the medium term.

Advantageously, the system for preventing collisions with the terrain also comprises short-term terrain collision risk alarm means likening a collision in the short term with the terrain to the penetration of the terrain into an alarm protection volume linked to the aircraft that models a predefined standard vertical avoidance maneuver undertaken in the short term.

Advantageously, when the system for preventing collisions with the terrain comprises medium- and short-term terrain collision risk warning and alarm means, it implements a protection volume for the determination of the clearance sectors and of the warning and alarm protection volumes modeling predefined standard avoidance maneuver trajectories of different types, the predefined trajectory modeled in the protection volume for the determination of the clearance sectors having a climb slope greater than the predefined trajectories modeled in the warning and alarm protection volumes.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
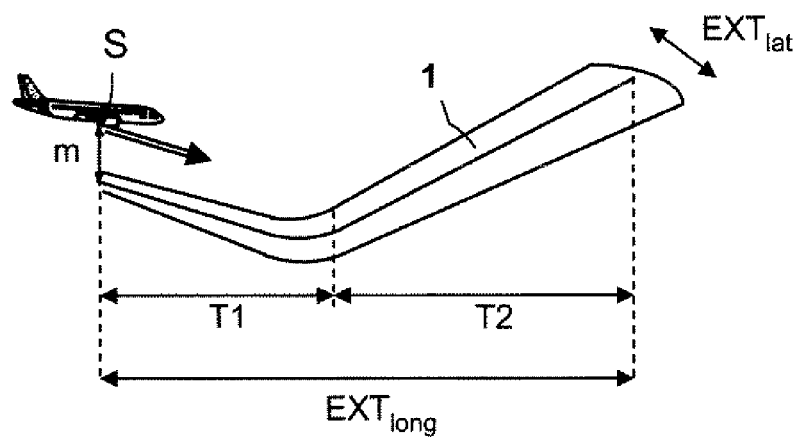
FIG. 1 illustrates the form of a feeler constituting the bottom and front surface of a protection volume linked to the aircraft and used to detect the crossing of the limit point for success of a standard vertical avoidance maneuver.

The system for preventing collisions with the terrain that will be described is based on the one hand on an a priori knowledge of the trajectories corresponding to the standard vertical terrain avoidance maneuvers recommended to the pilot of an aircraft, and on the other hand on the forecasting, currently well controlled over a short period, of the order of a few minutes, of the trajectory followed by an aircraft, made on the basis of the characteristics and, possibly, of the changes of the speed vector of the aircraft, to provide the pilot with an indication on one or more effective avoidance trajectories with or without an automatic engagement of an avoidance maneuver in case of imminent risk of conflict with the terrain.

The a priori knowledge of the trajectory corresponding to a standard vertical avoidance maneuver is drawn from a behavioral study of the type of aircraft concerned that makes it possible to predetermine different forms of vertical avoidance trajectory taking account of the instantaneous climb capabilities of the aircraft, based on parameters such as the weight of the aircraft, its inertia, its speed on engagement of the maneuver, the repowering inertia of its engines, its configuration of the moment: loss of an engine, position of the flaps, of the leading-edge slats, of the de-icing systems, of the aerodynamic brakes, of the rate of turn, of the roll, the roll speed, etc. The various predetermined forms of the trajectory followed during a standard vertical avoidance maneuver or the climb capability data of the aircraft from which they devolve can, for example, be stored in an onboard database and selected from parameter values such as the weight and/or the inertia of the aircraft delivered by the flight instruments, as well as other configuration parameters.

To fulfill its functions, this system for preventing collisions with the terrain likens the risks of collision with the terrain to the penetration of a model of the terrain being flown over generated from a topographic database, in one or more protection volumes linked to the aircraft modeling standard vertical avoidance maneuver trajectories engaged in the more or less short term.

The protection volumes extend in front of the aircraft, in its direction of movement with bottom and front surfaces with longitudinal profiles in paddle form corresponding to a predetermined standard vertical avoidance maneuver trajectory engaged in the more or less short term based on an extrapolation of the trajectory of the aircraft deduced from the characteristics and, possibly, from the variations of its speed vector. They are called "feelers" because they are mainly defined by their bottom and front surfaces since the aim is to detect a penetration of the terrain being flown over.

More specifically, the system for preventing collisions with the terrain that will be described implements:
- a first feeler for the limit point of effectiveness of a standard vertical avoidance maneuver, to detect a risk of collision with the terrain that can simply be evaded by a standard vertical avoidance maneuver and possibly signal it to the pilot of the aircraft by oral or visual indications,
- a second feeler for analyzing lateral escape possibilities offered by the vicinity of the aircraft to determine the azimuth sectors open to a standard vertical avoidance maneuver preceded by a change of heading called compound avoidance maneuver and signal these sectors to the pilot (for example by means of trend bars appearing on a screen displaying the primary flight parameters) if a reaction is required on his part to avoid the collision with the terrain,
- a third and a fourth warning and alarm feelers, of scaled lengths, constructed around standard vertical avoidance maneuvers undertaken later than for the first and second feelers, and conventionally used to trigger earlier warnings and alarms, the warnings signaling the need to correct in the short term the trajectory followed by the aircraft and the alarms signaling the obligation to undertake without delay a standard vertical avoidance maneuver,
- a fifth feeler constructed around a standard avoidance maneuver undertaken, during the resolution of a proven risk of collision with the ground, on a trajectory resuming the orientation of the trajectory initially followed on the detection of the proven risk of collision with the ground and used to detect the end of resolution of a proven risk of collision with the ground,
- a logic controller which optionally provides instructions (slope and heading) to an automatic pilot for the execution of a standard or compound terrain avoidance maneuver just before reaching the limit point of loss of effectiveness of the standard vertical avoidance maneuvers and which can be taken out of service by disengaging the automatic pilot, the pilot retaining full authority over the flight controls,
- a signaling device providing the various oral or visual indications characterizing the trend of a risk of collision with the terrain including the early warnings and alarms of risk of collision with the terrain, the alarm indicating that the limit point of effectiveness of the standard vertical avoidance maneuvers has been passed, the azimuth sectors still open to a standard vertical avoidance maneuver after passing the limit point, the assured resolution of a proven risk of collision with the ground taking into account the trajectory of the avoidance maneuver undertaken, the end of the resolution of a proven risk of collision with the ground and the effective disappearance of a proven risk of collision with the ground, and
- a device for inhibiting these mechanisms on "nominal" approaches to a runway.

It should be noted that the third, fourth and fifth feelers are not essential to the implementation of the invention.

The point from which the trajectory followed presents risk of collision with the terrain such that it is no longer possible to perform a standard vertical avoidance maneuver generally follows two successive points of the trajectory followed by an aircraft signaled by the operational TAWS systems:
- a first warning point from which a risk of conflict with the terrain is detected and warrants being signaled to the pilot for him to adjust the trajectory. At this point, a system of TAWS type emits an oral warning of "Caution" type.
- a second alarm point from which the risk of conflict with the terrain is such that a standard vertical avoidance maneuver must immediately be undertaken by the pilot. At this second point, a system of TAWS type emits an oral alarm of "Pull Up" type.

It should be noted that, in certain situations, the trajectory followed can directly bring an aircraft from the first warning point to the limit point of effectiveness of a standard alarm point vertical avoidance maneuver without passing through the alarm point. It should also be noted that, in certain variants of the invention, the system may not generate these warnings and alarms.

The determination of the crossing by the aircraft of the limit point of imminent conflict with the terrain from which a standard vertical terrain avoidance maneuver is no longer effective is likened to the penetration of the topographic representation of the terrain generated from a database of elevations of the terrain that is onboard or that can be consulted from the aircraft, in a limit-point feeler that corresponds to the bottom and front surface of a protection volume linked to the aircraft modeling a trajectory of a standard vertical avoidance maneuver undertaken immediately or almost immediately, after a time below which the pilot practically has no more time to react, of predetermined duration typically between 0 and 3 seconds, generally constant, but possibly being variable and depending on criteria relating to the nature of the current flight phase, the altitude of the aircraft or other criteria.

As shown in FIG. 1, the limit-point feeler 1 presents a longitudinal extension $EXT_{long}$ in the direction of movement of the aircraft and a lateral extension $EXT_{lat}$ transversal to the movement of the aircraft. Its longitudinal extension $EXT_{long}$ has a profile corresponding to an extrapolated trajectory comprising two parts or successive flight times:

a first flight time T1 of initialization of a standard vertical avoidance maneuver going from the current position S of the aircraft to a leveling-off preceding the effective climb of the aircraft corresponding to a reaction time of a pilot having taken the decision to perform a standard vertical avoidance maneuver, augmented by the times to level the aircraft, to assume an incidence suited to a climb slope equal or close to a possible maximum and to switch the engines to maximum thrust speed. This first part has a duration of the order of ten or so seconds, and a second flight time T2 corresponding to a climb with slope equal or close to the maximum.

The form and the duration of travel of the trajectory of the first part T1, and the climb slope of the second part T2 are given by tables that take into account parameters such as the type of aircraft, its weight, its speed, its rate of turn and its roll angle, its roll speed, the engine speed restoration inertia, etc.

The engine repowering inertia delay, which is a function of the airspeed of the aircraft and of its engine speed on engagement of a terrain avoidance maneuver, is taken from a chart or a 2D table drawn up either on the basis of performance characteristics supplied by the aircraft constructor, or on the basis of generic conservative values for all aircrafts having the same engines.

The longitudinal extension $EXT_{long}$ of the limit-point feeler 1 typically covers two minutes of flight, but can be adjusted according to the flight phase or the area in which the flight is taking place. For example, in a mountainous airport area, it can be adjusted according to the aircraft-runway distance obtained by the use of data contained in a database on the coordinates of the airport runways.

The lateral extension $EXT_{lat}$ of the limit-point feeler 1 takes account of the location uncertainties of the aircraft due to the inaccuracies of its onboard locating instruments and the topographic representation of the terrain generated from the terrain elevation database. It is increased with the forecasting delay. The width of the feeler at the level of the current position of the airplane is a predetermined value typically of 100 m for example. For a given implementation, this width is generally constant. However, in certain implementations, this width can have a value that is variable according to criteria such as the level of navigation accuracy, the flight phase, altitude or others. From the current position of the aircraft, the feeler opens out typically by 1.5° either side of the direction of movement of the aircraft when it flies in a straight line and is increased to a value such as 90° for example on the side of the turn when it is turning, according to the rate of turn. On the other side of the turn, the angle can remain unchanged because, if the execution of an avoidance maneuver proves necessary, the area used for this maneuver must remain protected.

For the detection of a penetration of the terrain being flown over through the limit-point feeler 1, account is taken of a vertical safety margin m which is either added to the modeling of the terrain taken into account, or, as here, subtracted from the altitude of the aircraft, lowering by so much the limit-point feeler 1 relative to the modeling of the terrain taken into account. This safety margin under the current position of the airplane and/or under the trajectory followed by the aircraft here corresponds to the minimum acceptable margin for avoiding an accident. Its value is, for example, between 0 and 100 ft but it can be a little greater. The maximum value must take into account, as already described in the U.S. Pat. No. 5,488,563 and U.S. Pat. No. 5,638,282, the various errors impacting on the actual height above the real ground, including: the accuracy of the terrain database, the accuracy of the vertical position of the airplane given by the onboard instruments, the minimum margin for crossing usual obstacles such as: trees, buildings (these are typically less than 100 ft). More generally, this safety margin is at most equal to the margin adopted for the feelers used by the systems of TAWS type for warnings of "caution" type and alarms of "warning" type.

For more details on the configuration of a limit-point feeler 1, reference can be made to the French patent application FR 2.864.270 filed by the applicant.

The detection of a penetration of the terrain being flown over in the limit-point feeler 1 is obtained:

by positioning the limit-point feeler 1 relative to the topographic representation of the terrain being flown over, on the one hand, laterally based on information on the geographic position of the aircraft and on its direction of movement (route) delivered by its onboard instruments and, on the other hand, vertically by taking account of the vertical safety margin based on an altitude indication delivered by the onboard instruments of the aircraft, and by searching for the points of the limit-point feeler 1 that penetrate the topographic representation of the terrain being flown over, for example by sampling the limit-point feeler via the geographic location grid used implicitly in the terrain elevation database to grid the terrain being flown over, or by interpolation between points of the grid.

A detection of penetration of the terrain being flown over in the limit-point feeler 1 signaling the ineffectiveness of the standard vertical terrain avoidance maneuvers is used to inform the pilot of a situation of imminent risk of collision with the ground by oral and/or visual indications (such as, typically, an announcement of "Avoid Terrain" type) and to launch a process to assist in resolving the proven risk of collision with the terrain.

The identification of the avoidance or clearance azimuth sectors remaining open to a standard vertical avoidance maneuver after a change of heading is done by analyzing azimuth sectors that are free of penetration of the terrain within a dedicated feeler, corresponding to a very great increase in the azimuth aperture of the limit-point feeler. This dedicated feeler corresponds to the bottom and front surfaces of a protection volume modeling not only the trajectory of a standard vertical avoidance maneuver undertaken immediately or within the shortest possible delay, but also a set of compound trajectories comprising a first part corresponding to a more or less banked initial change-of-heading maneuver trajectory, prolonged by a second part corresponding to a standard vertical avoidance maneuver trajectory.

Figure 2:
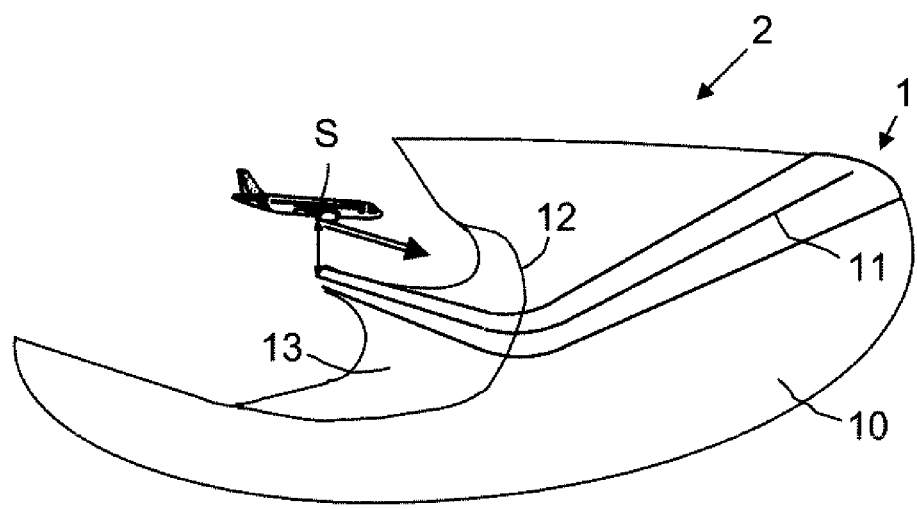
FIG. 2 illustrates the form of an analysis feeler with large azimuth aperture used to determine clearance sectors, FIG. 3 gives an example of penetration of the terrain into the analysis feeler illustrated in FIG. 2.

As represented in FIG. 2, the feeler 2 used in analyzing the escape possibilities offered by the vicinity of the aircraft reflects the surface of the limit-point feeler 1 complemented by lateral extensions giving it a generally flared form recalling that of a battleaxe. More specifically, the analysis feeler 2 presents a raised front surface 10, generated by a directrix 11 having the form of a second part with climb slope close to the maximum, of a standard vertical avoidance maneuver trajectory relying at its base on a generatrix 12 in open arc-of-circle form, formed instead of the points of completion of the initial change-of-heading maneuvers within range of the aircraft. This raised front surface is prolonged in the direction of the current position S of the aircraft by a sectoral connecting surface 13 containing all the change-of-heading trajectories within range of the aircraft, limited to a maximum change of heading that can range up to 180/190 degrees in order to probe the half-turn possibilities.

The place 12 of the points of completion of the change-of-heading maneuvers corresponds to the place of the ends of the cords of the change-of-heading turns. It can be determined from forecast flat turn trajectories, with constant roll angles SIDE_BANK, typically 3°/second, and traveled with a constant air speed TAS, which stops at the moment when the wings of the aircraft level off after the aircraft has reached the desired heading, and the radius of which, set according to the performance characteristics of the aircraft and a desired degree of comfort, satisfies the class relationship:

$$R = \frac{TAS^2}{g \times \tan(SIDE\_BANK)}$$

g being the gravity acceleration.

This place 12 of the points of completion of the change-of-heading maneuvers takes the form of a curved segment similar to an arc of circle that is also open if it is accepted that all the turns are executed with one and the same roll angle, one and the same speed, and have one and the same radius. It is not necessarily symmetrical on either side of the aircraft, because it depends on the initial roll angle of the aircraft and can result, in one direction, from the extension of an initial turn and, in the other direction, from a cancellation of the initial turn with leveling-off trajectory before initiating a turn on the other side.

As a variant, the analysis feeler 2 may not be situated at the same level as the limit-point feeler 1 in the direction of movement of the aircraft but come slightly below or beyond the limit-point feeler 1.

Figure 3:
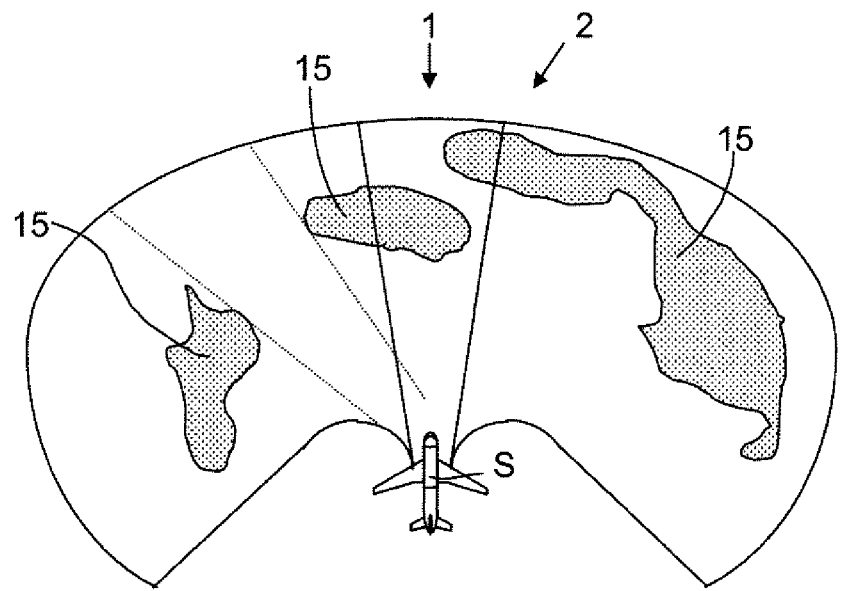
Figure 4:
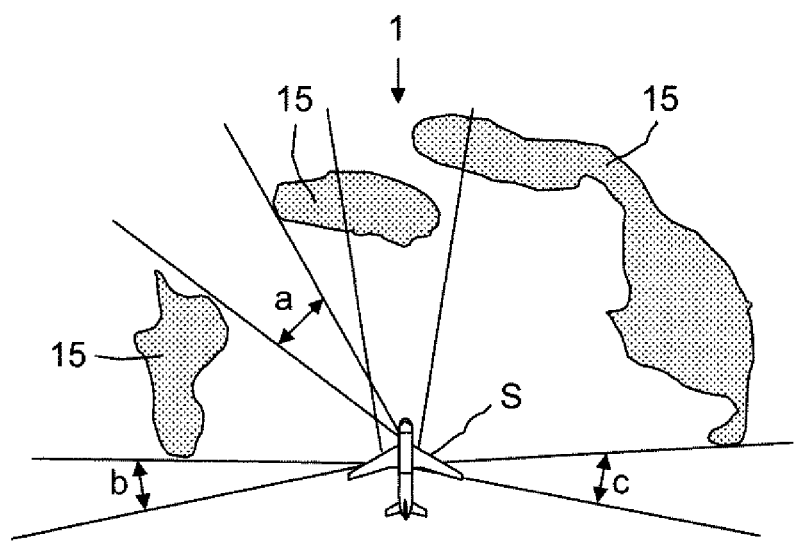
FIG. 4 illustrates one way of determining the azimuth sectors that are open to a clearance maneuver in the example of penetration of the terrain into the analysis feeler shown in FIG. 3.

The detection of a penetration of the terrain being flown over in the limit-point feeler 1 signaling a proven risk of collision with the terrain that cannot be resolved by a standard vertical avoidance maneuver leads, as represented in FIG. 3, to an inventory of the points of the terrain being flown over that penetrate into the analysis feeler 2, then, as represented in FIG. 4, a search for the azimuth sectors centered on the current position S of the aircraft that are still open, that is free of penetration by points of the terrain being flown over.

The inventory of the points 15 of the terrain being flown over that penetrate into the analysis feeler 2 is done, as for the limit-point feeler 1, by positioning the analysis feeler 2 laterally and vertically relative to the topographic representation of the terrain being flown over generated from the terrain elevation database and by comparing, after taking into account the altitude safety margin, the altitudes of the points of the analysis feeler 2 at the elevations of the points of same geographic coordinates of the topographic representation of the terrain being flown over.

The search for the azimuth sectors a, b, c that are still open is done, for example, by a geometrical analysis of the disposition on the ground of the sets of penetration points 15 found in the inventory consisting in having this disposition on the ground scanned by a pivoting horizontal axis rotating about the position S of the aircraft and in identifying the angular positions where the axis does not intercept any penetrating point. In the example of FIG. 4, this geometrical analysis gives three open sectors: a sector a slightly to the left of the aircraft and two sectors b and c placed laterally at the limit of the heading range covered by the analysis feeler 2.

On the detection of an imminent risk of collision with the terrain signaled by a penetration of the terrain into the limit-point feeler 1, and therefore that cannot be resolved by a simple standard vertical avoidance maneuver, the open azimuth sectors found by means of the analysis feeler 2 have their aperture angles tested for their suitability for modeling a standard vertical avoidance maneuver trajectory that observes a lateral safety margin relative to the reliefs of the terrain being flown over, for example by imposing a minimum length on their arcs of circles at the level of their points of contact with sets of penetrating points.

Then, the open azimuth sectors having satisfied the test of the lateral margin are subjected to an estimation of free-travel distances that are free of potential conflict with the terrain, consisting in a search for limit points of effectiveness of a standard vertical avoidance maneuver in their aperture angles. This search is done by scanning their aperture angles by distancing trajectories, straight and of arbitrary slope, preferably the slope of the trajectory of the aircraft at the moment it crosses the first point depriving it of the possibility of resolving its risk of collision with the terrain by a simple standard vertical avoidance maneuver, or a zero horizontal trajectory slope or even a positive climb slope.

The benefit of adopting, for the distancing trajectories, the slope of the initial trajectory of the aircraft, is obvious in the case where the risk of collision with the ground is due to a heading error in approach bringing the aircraft to an obstacle that it would normally have had to go around, its normal route having the greatest chances of being located in an open azimuth sector close to its initial route, presenting a free-travel distance corresponding to its approach distance.

The benefit of adopting horizontal distancing trajectories with zero slope, results from the fact that the aircraft mostly turns flat and returns to a horizontal trajectory on leaving a turn.

The benefit of adopting climb mode distancing trajectories is obvious in the case where the aircraft turns by adopting as early as possible a climb slope to anticipate the resolution of the risk of collision with the ground and reach a safety altitude.

Figure 5:
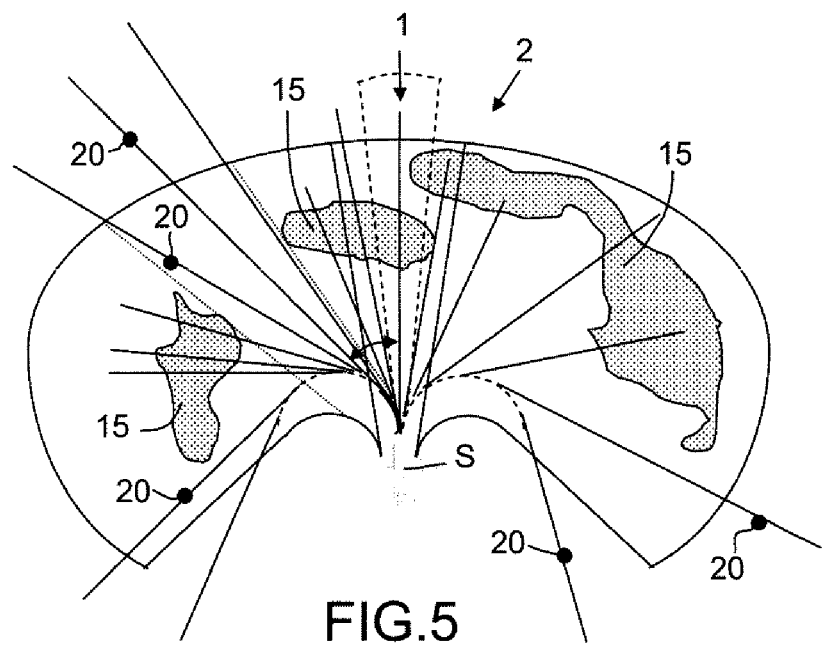
FIG. 5 illustrates a way of estimating, in the azimuth sectors open to a clearance maneuver, the free-travel distances free of potential conflict with the terrain, FIG. 6 gives an example of one-dimensional display of the azimuth sectors open to a clearance maneuver, FIG. 7 gives an example of two-dimensional display of the azimuth sectors open to a clearance maneuver and of the distances offered for a free travel free of potential conflicts with the terrain.

FIG. 5 gives an example of determination of free-travel distances over open azimuth sectors from ultimate points 20 marking the limit of effectiveness of a vertical avoidance maneuver concerning reliefs in the middle distance out of range of the analysis feeler 2 or of the limit-point feeler 1. This determination is done by incrementing the angular route deviation. It can also be done by other methods, for example, by distance increment along the turn trajectories of the arc-of-circle generatrix 12 of the analysis feeler 2.

Free-travel distances are determined on horizons of two to five minutes of flight for turn trajectories ranging up to changes of heading of 180 to 190 degrees covering a complete turnaround, the aircraft origin trajectory being considered to be safe and therefore a candidate for an evasive maneuver that can be envisaged if rejoining it is possible.

Figure 6:
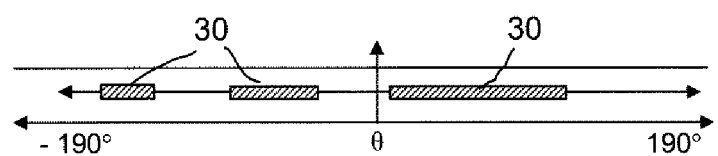

FIG. 6 shows one possible form of one-dimensional display, of the azimuth sectors open to a clearance maneuver. The latter takes a form of segments 30 of a strip graduated by angular heading deviation θ or distance along a turn trajectory. This strip can be configured to be overlaid on the scale of the headings of a screen PFD displaying primary flight parameters or be added to the base or the top of a map listing the threatening reliefs on a navigation screen.

Figure 7:
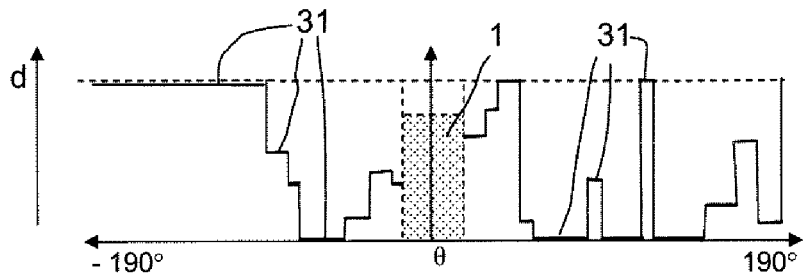

FIG. 7 shows one possible form of two-dimensional display, of the azimuth sectors open to a clearance maneuver with their free-travel distances. The latter takes the form of a curved diagram 31 graduated on the x-axis by angular heading deviation θ or by distance along a turn trajectory and, on the y axis, by free-travel distance, with, at the center, the sector covered by the limit-point feeler 1.

These FIGS. 6 and 7 have no correlation with the situation illustrated in FIG. 5.

Optionally, one of the azimuth sectors open to a clearance maneuver and that has satisfied the lateral margin test is given preference for the provision and indication of a change of heading. It is selected so as to obtain a trade-off between the following different aspects:

minimum route alteration,
minimum alteration of the climb slope (the latter needing to be all the smaller as the route alteration increases)
the widest possible clearance sector (the latter needing to be all the greater as the route alteration increases)
distance to a new potential risk of conflict with the terrain that is as distant as possible (the latter needing to be all the greater as the route alteration increases), by starting from the following two observations:

the less high the uncrossable relief is above the current trajectory of the aircraft, the easier it will be for the aircraft to pass over it. It will be easier for the aircraft to pass over than to initiate an entire turn, but the "after warning" time becomes all the shorter as the relief amount by which the relief exceeds the current trajectory of the aircraft reduces,
the higher the uncrossable relief is above the current trajectory of the aircraft, the more difficult it will be for the aircraft to pass over it and it will be easier for it to initiate a turn rather than a strong climb over a long distance. Also, the detection will be made early and the "after warning" time will be lengthy, which encourage the avoidance maneuvers to be anticipated over the clearance trajectories.

For this selection, the heights of the reliefs limiting the free-travel distances over the open azimuth sectors are converted into distances prior to the ultimate points in order to situate, upstream of the ultimate points of the clearance trajectories, points for initializing a preventive vertical avoidance maneuver with slope that is more moderate than a standard vertical avoidance maneuver.

Figure 8:
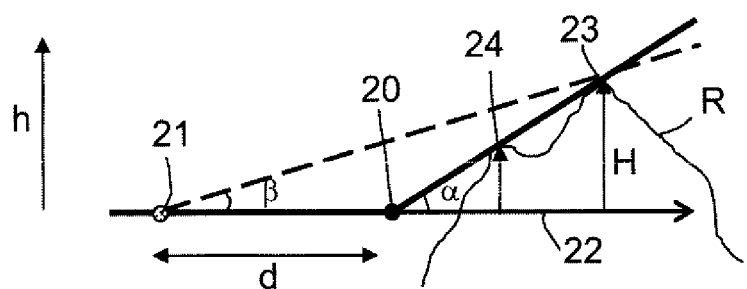
FIG. 8 is a diagram explaining the determination of the position of a point of initialization of a vertical avoidance maneuver with moderate climb slope, FIG. 9 gives an example of two-dimensional display of the azimuth sectors open to a clearance maneuver, and of the distances offered for immediate and short-term free travel.

FIG. 8 illustrates the determination of the placement of a point of initialization 21 from an ultimate point 20, on a clearance trajectory of an open azimuth sector with limited free-travel distance. The placement of the ultimate point 20 is determined by displacing, along the clearance trajectory 22 that is assumed to be horizontal, a standard vertical avoidance maneuver profile of slope α corresponding to a value close to the acceptable maximum for the aircraft given its type, its weight and its speed, until it comes into contact with the relief. The point of initialization is then likened to the point 21 of the clearance trajectory, placed upstream of the ultimate point 20, looking from a slope angle β less than the slope angle α, the point of contact 23 with the relief R, of the standard vertical avoidance trajectory. The free-travel distance d, which is the distance separating the point of initialization 21 from the ultimate point 20, satisfies the defining relationship:

$$d = H(1/tg(\beta) - 1/tg(\alpha))$$

H being the relative height of the relief of a point of contact 23 relative to the clearance trajectory concerned.

The slope angle β of the preventive vertical avoidance maneuver can be determined according to different parameters such as the slope α of a standard vertical avoidance maneuver which is a function of the maximum possible flare of the aircraft given its instantaneous climb performance characteristics and/or the variation of heading. It satisfies, for example, a defining relationship of the form:

$$\beta = f(\alpha) * f(\text{variation track})$$

with $$f(\alpha) = \alpha/2$$

$$f(\text{variation track}) = \cos(\text{variation track}) \text{ or } \cos(\text{variation track}/2).$$

The placement of the point of initialization 21 can also be determined, like that of an ultimate point 20, by displacing, along the clearance trajectory, a moderate vertical avoidance maneuver profile of slope angle α, until it comes into contact with the relief. Certain open azimuth sectors that do not present any proven risk of collision over the horizon for determining free-travel distances for the value of slope angle β of a standard vertical avoidance maneuver, therefore no ultimate point, may nevertheless return a distance for the point of initialization. To cover this case, it is always possible to repeat the logic for determination of the ultimate points with a vertical avoidance maneuver of slope that is no longer equal to α but to β.

On determining an ultimate point 20, several points 23, 24 of contact with the relief may simultaneously emerge. In this case, the only one considered is the point of contact 22 having the greatest relative height, unless the lowest relative height still remains a deciding factor in determining the optimum variation of heading.

Figure 9:
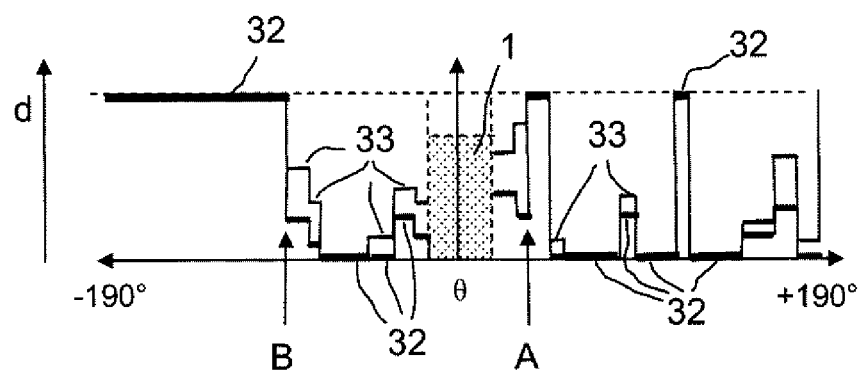

FIG. 9 shows one possible form of two-dimensional display, of the azimuth sectors open to a clearance maneuver with their immediate free-travel 32 and short-term free-travel 33 distances. This form of display consists of a diagram graduated on the x axis by angular heading deviation θ or by distance along a turn trajectory and, on the y axis, by free-travel distance, with, at the center, the sector covered by the limit-point feeler 1 showing two curves: the curve 32, in bold lines giving the immediate free-travel distances that are still the smallest and the curve 33 in fine lines giving the short-term free-travel distances that are often greater because of the moderate vertical avoidance maneuver that they assume. In addition to the curves 32 and 33 giving the immediate and short-term free-travel distances, there are an indication A of the new route recommended as a priority or implemented automatically, and an indication B of a new route recommended as a second choice but less satisfactory from the point of view of the trade-off that is sought (minimum route alteration, minimum alteration of slope, of climb, widest possible clearance sector, new potential risk of conflict with the terrain as distant as possible).

The determination of the points of initialization of a moderate vertical avoidance maneuver, which has just been described, adapts to non-horizontal clearance trajectories, the height of the relief H considered, which is the relative height relative to the clearance trajectory, becoming lower for a climbing clearance trajectory and greater for a descending clearance trajectory and the slope angles α and β being taken into account by their deviations relative to the slope angle of the clearance trajectory.

The limit-point feelers 1 and analysis feeler 2 are advantageously complemented by warning 3 and alarm 4 feelers making it possible to provide warnings and alarms while the standard vertical avoidance maneuvers are still effective.

Figure 10:
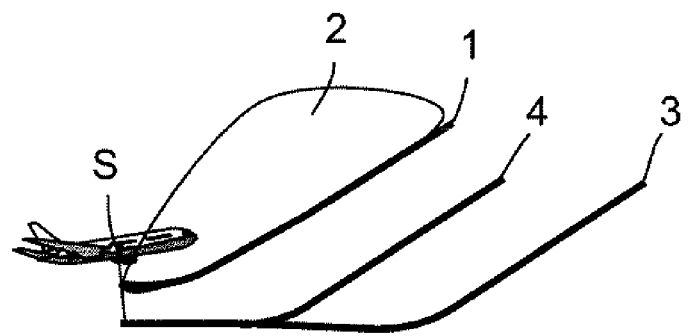
FIGS. 10 and 11 represent, in vertical and horizontal projections, the association of the limit point and analysis feelers with warning and alarm feelers.
Figure 11:
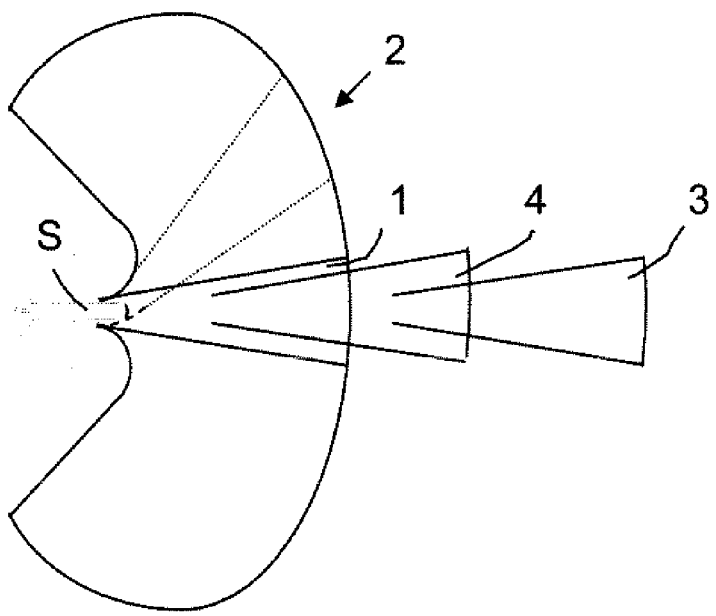

FIGS. 10 and 11 show, in vertical and horizontal projection, a combined use of the limit-point and analysis feelers 1 and 2 with two other warning and alarm feelers 3 and 4 of scaled lengths, constructed, taking into account a vertical safety margin greater than that of the limit-point and analysis feelers 1 and 2, around a standard vertical avoidance maneuver engaged increasingly late such as those used by the operational TAWS systems to trigger their warnings and alarms. Here, the feeler 4 is used to trigger a "Pull-up" voice alarm indicating to the pilot an obligation to undertake without delay a standard vertical avoidance maneuver, whereas the feeler 3 is used to trigger a "Caution" voice warning, indicating to the pilot that he must, in the short term, modify the trajectory being followed. The alarm feeler 4 is constructed around a standard vertical avoidance maneuver undertaken not immediately, as for the limit-point feeler 1, but in the very short term to allow the pilot the response time needed to take account of a voice alarm. The warning feeler 3 is constructed around a standard avoidance maneuver undertaken in the medium term to allow the pilot the time to analyze the situation having provoked the voice warning and to decide on a trajectory modification with which to resolve the proven risk of collision with the ground.

For more details on the operational TAWS systems that use feelers to generate "Caution" voice warnings and "Pull up" voice alarms intended for the pilot, reference can be made to the American U.S. Pat. No. 5,488,563 and U.S. Pat. No. 5,638,282 (Chazelle, Hunot, Lepere).

The combined use of the limit-point and analysis feelers 1 and 2 with the warning and alarm feelers 3 and 4 of a TAWS system makes it possible to improve the relevance of the voice warnings and alarms intended for the crew.

Thus, in the absence of a detection of terrain by the alarm feeler 4, no terrain alarm is emitted, whether there are lateral clearance possibilities, the feeler 2 not detecting terrain, which is the normal flight case, or whether there is no possibility of lateral clearance, the analysis feeler 2 detecting the terrain all around, which is the case of a flight in a valley.

With the detection of terrain by the alarm feeler 4, a "Pull up" type terrain alarm is emitted as long as the limit-point feeler 1 does not detect terrain, because there is a risk of frontal collision with the terrain with a possibility of vertical clearance but not necessarily a possibility of lateral clearance, the analysis feeler being able to detect the terrain all around, which is the case of a risk of frontal collision in a valley.

With a detection of terrain by the alarm 4 and limit-point 1 feelers, the "Pull up" type alarm is replaced by an "Avoid terrain" type alarm, because there is no longer any possibility of vertical clearance.

In the case of a "Pull up" or "Avoid Terrain" type terrain alarm, the analysis feeler 2 is displaced in front of the aircraft, on its predictable trajectory, to the point where any evasive possibility disappears, this point locating the ultimate instant before which an avoidance maneuver must be initiated being signaled to the crew and possibly used to set the start instant of an automatic terrain avoidance procedure.

Figure 12:
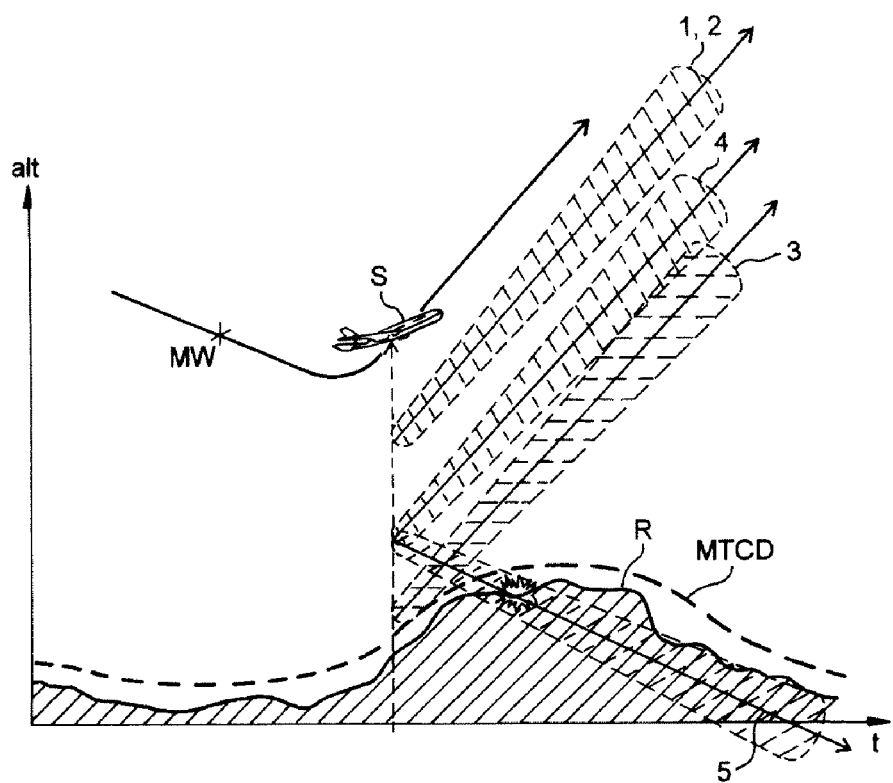
FIG. 12 shows, in vertical cross section, an association of limit point, analysis, warning, alarm and end-of-conflict feelers.

A TAWS-type system for preventing collisions with the terrain with limit-point and analysis feelers is advantageously provided with a device for confirming a resolution of a conflict with the terrain signaling the possibility for the aircraft of resuming a normal trajectory without conflict with the terrain in the short and medium terms operating, either by monitoring the current altitude of the aircraft and detecting its crossing by a value greater than a safety altitude, or, as shown in FIG. 12, by monitoring the elimination of any penetration of points of the terrain being flown over into a specific end-of-conflict feeler.

FIG. 12 shows a real-life situation of an aircraft that was initially descending to a point MW of its trajectory where it was warned by an onboard TAWS-type system of a risk of collision with the terrain, or rather with a surface MTCD covering the relief R and corresponding to a minimum safety margin taking into account various inaccuracies concerning the elevations of the terrain and concerning the measurement of the height of the aircraft above the ground and which has begun a standard vertical avoidance maneuver bringing it to its current position S, on a climb trajectory.

The onboard TAWS-type system implements the limit-point and analysis feelers 1 and 2 and warning 3 and alarm 4 feelers and a specific end-of-conflict feeler 5. The limit-point, analysis, alarm and warning feelers 1, 2, 3 and 4, which are flat because the aircraft has undertaken the second part, with climb slope close to the maximum, of a standard vertical avoidance maneuver, and which no longer provoke either warning or alarm because they no longer encounter any point of the terrain being flown over, inform the pilot of the correct effectiveness of the standard vertical avoidance maneuver undertaken but do not inform him as to the possibility or otherwise of resuming the descent maneuver that he was following before the terrain collision risk warning or alarm. This function is assigned to the end-of-conflict feeler 5 constructed around a hypothetical route resumption trajectory resuming the initial heading of the aircraft and the slope of its initial trajectory or a horizontal slope. In the situation represented, the end-of-conflict feeler 5 intercepts the surface MTCD covering the terrain being flown over, indicating that the standard vertical avoidance maneuver currently being carried out must be continued before the risk of collision with the terrain can be considered to be resolved.

A TAWS-type system for preventing collisions with the terrain with limit-point and analysis feelers is advantageously provided with a device for inhibiting warnings and alarms, signaling clearance sectors and optionally implementing the automatic engagement of avoidance maneuvers when the aircraft is performing an approach towards a landing runway (on which it intends to put down) or a clearance from a take-off runway, the runway information being obtained by the use of data contained in an airport runway coordinates database.

This inhibiting device can base the inhibition or otherwise of the warnings, alarms, signaling of clearance sectors and optional implementation of automatic engagement of avoidance maneuvers on a criterion of presence or otherwise of the aircraft on or in the immediate vicinity (to take account of positioning and trajectory-following inaccuracies) of an authorized approach or clearance trajectory for a landing-take-off runway according to the concept commonly referred to as "Landing Tunnel", typically described in the American U.S. Pat. No. 6,088,654, this criterion of presence or absence in the vicinity of an approach trajectory being able to be complemented or modified by other criteria such as the selection of the approach mode for the automatic pilot of the aircraft.

Different variants can be envisaged in the mode of operation of a system for preventing collisions with the terrain with limit-point feelers 1 and analysis feeler 2. Thus, the automatic engagement of a compound avoidance maneuver comprising a turn towards a clearance sector followed by a standard vertical avoidance maneuver, can be delayed until the remaining clearance sectors no longer satisfy certain predefined criteria, such as:

occupation of a range of headings less than, for example, 50% of the range of headings covered by the analysis feeler 2, clearance sectors requiring a minimum change of heading of more than, for example, 25°, change of altitude required in the clearance sectors to reach a safety altitude above, for example, 15000 ft.

In such variants, the analysis of the criteria for delaying the automatic engagement of a compound avoidance maneuver begins on passing the limit point of effectiveness of a simple standard vertical avoidance maneuver.

The climb slope taken into account in the determination of the trajectories of the standard vertical avoidance maneuvers can depend on the type of feeler concerned. Thus, for the limit-point 1 and analysis 2 feelers, it can be taken to be greater than the climb slope adopted for the warning 4 and alarm 3 feelers, when the latter is subject to a reduction (generally 10%) relative to the maximum climb slope corresponding to a safety margin.

Figure 13:
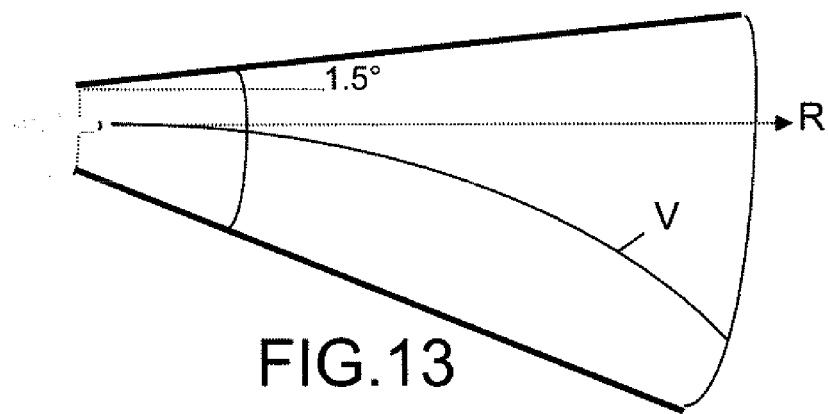
FIGS. 13, 14 and 15 illustrate, in horizontal cross section, different forms of feelers.
Figure 14:
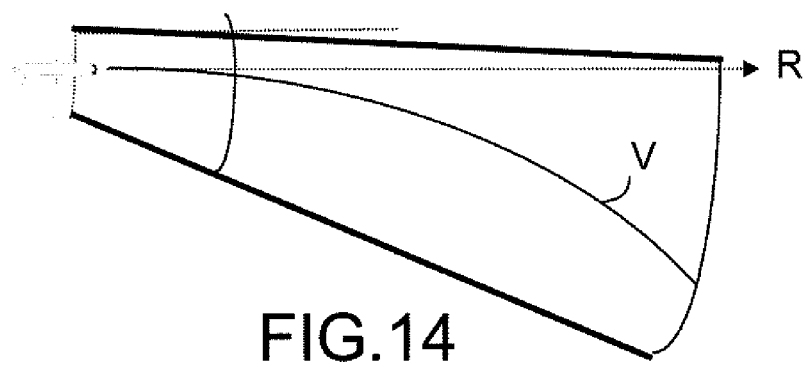
Figure 15:
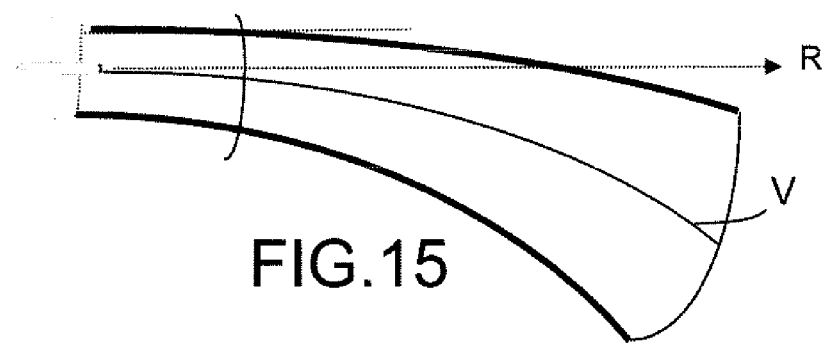

The various limit-point 1, alarm 3 and warning 4 feelers have been primarily described and represented in the context of an aircraft moving in a straight line, that is, with forms whose surfaces have displacement axes with straight-line horizontal projection for their generatrices. In the case of a movement of the aircraft in a turn, the forms and the apertures of these feelers 1, 3, 4 relative to the direction of movement of the aircraft are adapted, their generatrices becoming the axes of movement with curved projection corresponding to the turn and their apertures, which are of the order of 1.5° for a flight in a straight line, are enlarged on the inside of the turn according to the rate of turn, the enlargement possibly reaching 90°, and are maintained or reduced on the outside of the turn. FIGS. 13, 14, and 15 illustrate the various forms that devolve therefrom for the horizontal projections of the feelers. In these FIGS. 13, 14, 15, the aircraft is following, instantaneously, a route axis R while executing a turn of plot V.

As for the analysis feeler 2, it has a form that takes into account the local wind which reduces the apparent turn radii when it is a head wind and increases them when it is a tail wind. These apparent radii can be likened to half the distance of the points of the turns where the aircraft reaches a change of heading of 180°, points whose transversal distances relative to the aircraft satisfy the relationship:

$$x_t(t_{W1}) = WS_{X_t} \cdot t_{W1} - \delta \cdot R \cdot \cos(w t_{W1} + \gamma_t) + \delta \cdot R \cdot \cos(\gamma_t)$$

with $$t_{W1} = \frac{1}{w}\left[\arcsin\left(-\delta \frac{WS_{X_t}}{TAS} - \gamma_t\right) + 2k \cdot \Pi\right]$$

$$\gamma_t = -\delta \cdot (\text{Track} - \text{Heading})$$

$$R = \frac{TAS^2}{g \cdot \tan\varphi_{roll}}$$

$$w = \frac{TAS}{R} = \frac{g \cdot \tan\varphi_{roll}}{TAS}$$

TAS being the amplitude of the air speed of the aircraft,
g being the acceleration of gravity,
$\varphi_{roll}$ being the roll angle of the aircraft during the maneuver,
$\gamma$ being a factor dependent on the initial conditions,
$\delta$ being a coefficient equal to +1 for a turn to the right and −1 for a turn to the left,
$WS_{X_t}$ being the local cross-wind.

For a justification of this relation, reference can be made to the description of the French patent application FR 2.871878 filed by the applicant.

Figure 16:
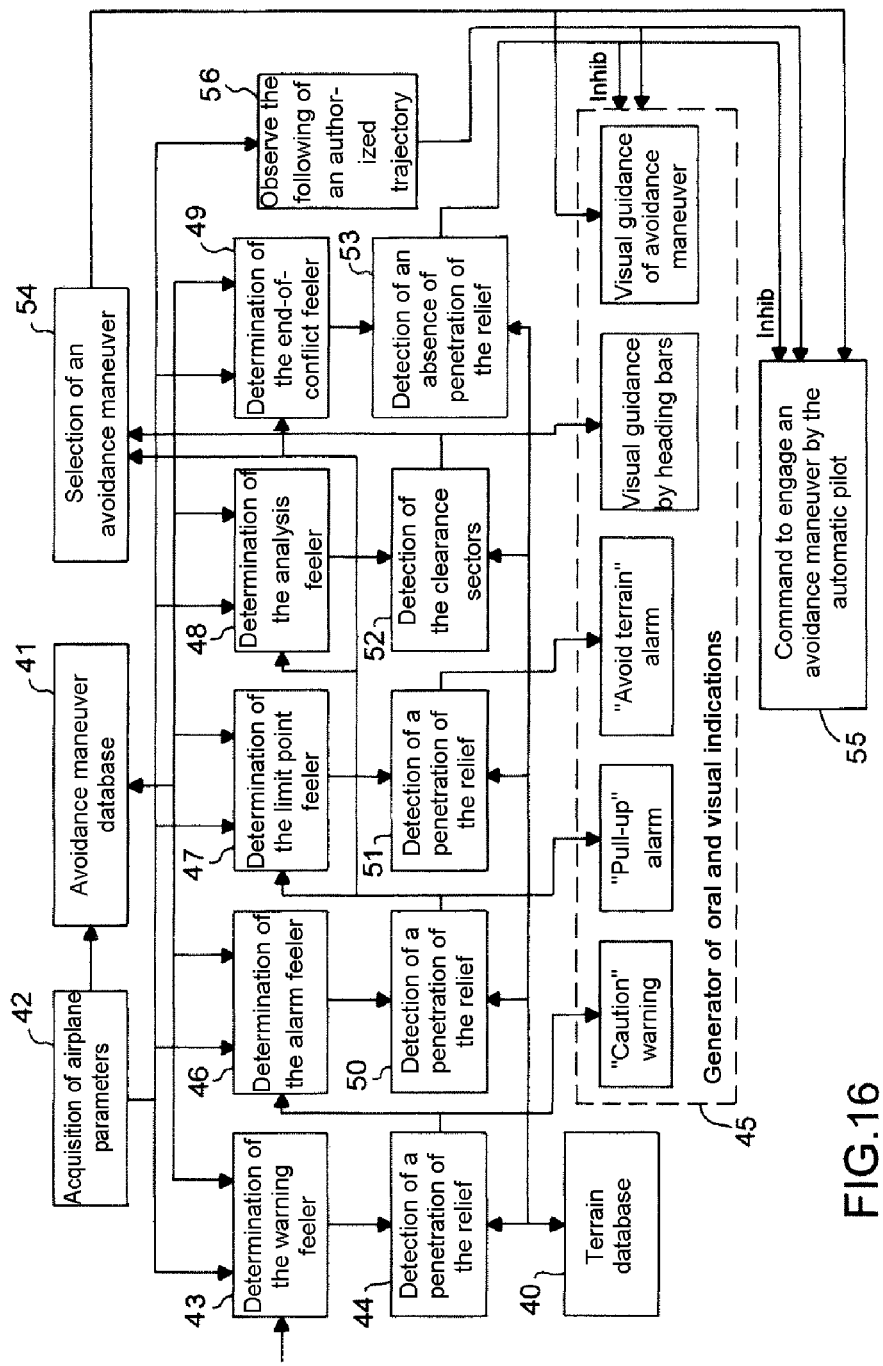
FIG. 16 illustrates one possible operation of a system for preventing collision with the terrain according to the invention.

FIG. 16 illustrates an example of operation of a system for preventing collisions with the terrain that implements the various feelers that have just been described.

The system implements a database 40 of terrain elevations, a database 41 of avoidance maneuvers or climb capabilities of the airplane and an airplane parameter acquisition system 42.

In the absence of a risk of collision, it generates in 43 a warning feeler from a predetermined vertical safety margin and from an extrapolation in the medium term (typically around 20 seconds) of the trajectory of the aircraft derived from the airplane parameters, continued over approximately two minutes by a standard vertical avoidance maneuver trajectory extracted from the database 41 of avoidance maneuvers by means of the airplane parameters and monitors in 44 any penetration into the warning feeler of the terrain being flown over, sampled in the database 40 of terrain elevations.

In the presence of a detection of penetration of the terrain being flown over into the warning feeler, it requests the attention of the pilot concerning the need to take account of a risk of collision with the terrain by asking a generator 45 of oral and visual indications to emit a "caution" warning, triggers the generation of a number of complementary feelers: in 46, an alarm feeler, in 47, a limit-point feeler, in 48, an analysis feeler, and in 49, an end-of-conflict feeler, monitors in 50, 51, 52 any penetration of the terrain being flown over into the new alarm, limit-point and analysis feelers with, in addition, in 52, an analysis of the azimuth sectors free of penetration with estimations of the free-travel distances and, in 53, a possible end of penetration of the terrain into the end-of-conflict feeler.

The alarm and limit-point feelers are generated in a way similar to that used for the warning feeler, the difference lying at the level of the extrapolation delay for the trajectory of the aircraft which is short term (typically around five to eight seconds) for the alarm feeler and very short term for the limit-point feeler (typically less than three seconds), and, possibly, at the level of the vertical safety margin which can have a different value for each feeler.

The analysis feeler, which has large lateral extensions, uses lateral turn trajectories similar to arcs of circles with radii dependent on the airplane parameters and on the local crosswind, and continued by a standard vertical avoidance maneuver trajectory extracted from the database 41 of avoidance maneuvers by means of the airplane parameters. It is generated from generatrices starting from the position of the aircraft or a predicted position, which are:

either direct straight lines from the climb position concerned (after a possible reaction period), or arcs of circles according to the current roll prolonged by straight-line climb trajectories, or curved trajectories preceded or not by arcs of circles, in instantaneous or deferred climb mode.

The end-of-conflict feeler is generated like the warning feeler, but from a medium-term extrapolation of the trajectory initially followed by the aircraft derived from the values of the airplane parameters set on detection of the risk of collision with the terrain currently being processed.

The different feelers are generated in a form with a surface in three dimensions discretized, for example, in distance or in time, azimuth and/or elevation. They have a space-time extension defined over a distance or time of travel, either equivalent for all the directions or variable according to the azimuth and, for a given direction (a generatrix) either fixed or variable depending on a criterion such as the relative height of the highest surrounding peaks. In the calculations, these surfaces can advantageously be folded back to a two-dimensional plane.

In the presence of detection, in 50, of a penetration of the terrain being flown over into the alarm feeler, it requests the attention of the pilot regarding the need to undertake without delay a standard vertical avoidance maneuver by asking the generator 45 of oral and visual indications to emit a "pull-up" alarm, possibly triggers, in 54, the identification and the selection of an avoidance maneuver for an engagement, in 55, of the automatic pilot in a terrain avoidance maneuver.

In the presence of detection in 51 of a penetration of the terrain being flown over in the limit-point feeler, it informs the pilot of the ineffectiveness of a standard vertical avoidance maneuver by asking the generator 45 of oral and visual indications to emit an "avoid terrain" type alarm.

In 52, it evaluate the azimuth sectors free of penetration of the terrain into the analysis feeler with the immediate and short-term free-travel distances and signals them for the attention of the pilot by asking the generator 25 of oral and visual indications to display the two-dimensional diagrams, triggers, in 54, the selection of an effective avoidance maneuver to signal it to the pilot via the generator 45 of oral and visual indications and, possibly, in 35, for an engagement of the automatic pilot in an avoidance maneuver.

Immediately on detection, in 53, of an end-of-detection of penetration of the terrain being flown over into the end-of-conflict feeler, or confirmation, in 56, that an authorized trajectory is correctly being followed, it inhibits all the warnings, alarms and avoidance maneuver recommendations emitted by the generator 45 of oral and visual indications, possibly signals to the pilot the resolution of the conflict by asking a generator 45 of oral and visual indications to emit an "end-of-threat" type warning and leaves only the warning feeler active.

Figure 17:
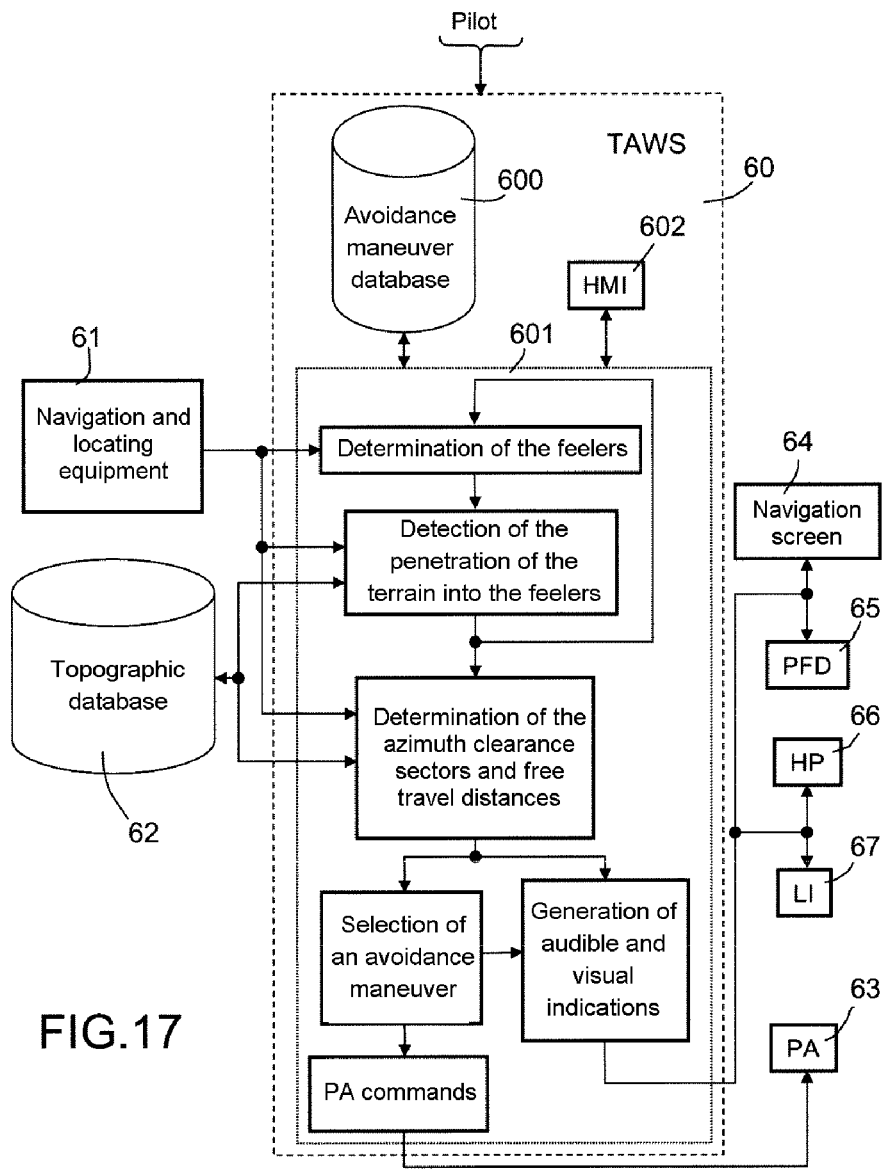
FIG. 17 illustrates the layout of a system for preventing collision with the terrain according to the invention in an aircraft environment.

As shown in FIG. 17, a TAWS-type system 60 for preventing collisions with the terrain is inserted into the onboard equipment of an aircraft between:

the navigation and locating equipment 61 combining the flight instruments and a geographic locating device, such as, for example, a receiver of a GNSS (acronym standing for "Global Navigation Satellite System") satellite positioning system, possibly complemented by an inertial unit, a baro-altimeter, a radio-altimeter or a combination of several of these sensors, a terrain elevation database 62, also comprising data on the geographic coordinates of the airport runways, automatic pilot PA equipment 63, instrument panel screens: navigation screen 64 displaying a navigation map, piloting screen 65 displaying the primary flight parameters, and warning emitters placed in the cockpit, mainly of audible or voice type 66: loudspeaker (HP), siren, buzzer, etc., but also of visual type 67: indicator (LI), etc.

It mainly comprises:

a database 600 of avoidance maneuvers or of climb capabilities of the airplane, a computer 601 using the information originating from the navigation and locating equipment 61 and databases 62, 600 of terrain elevations and of avoidance maneuvers to generate the different feelers: warning feeler, alarm feeler, limit-point feeler, analysis feeler, end-of-conflict feeler, detect penetrations of the terrain being flown over into these feelers, according to the detections made, signal the associated risks of collision with the terrain by warnings and alarms, relayed in the cockpit by warning and alarm emitters 66, 67, accompanied by recommendations on the choice of an avoidance maneuver and, possibly, commands for automatically following an avoidance trajectory, intended for the automatic pilot 63, and, possibly, a human-machine interface HMI 602, for example an MCDU (acronym standing for "Multipurpose Control Display Unit") or an FCU (acronym standing for "Flight Control Unit") enabling parameterizing of the system by a member of the crew of the aircraft or by a maintenance team, notably for the choice or otherwise of an automatic engagement of an avoidance maneuver.

The computer 601 can be a system-specific computer of TAWS type for preventing collisions with the terrain or a computer shared with other tasks such as flight management or the automatic pilot.

Obviously, it is possible to produce a system of TAWS type for preventing collisions with the terrain according to the invention in various forms equivalent to that which has just been described, which is purely one example out of the many possible within the scope of those skilled in the art.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A system for preventing collisions with a terrain comprising:

a detecting unit configured for detecting risks of collision with the terrain after a predetermined forecasting delay, the risks of collision being located in a protection volume linked to an aircraft and located relative to the terrain being flown over by means of an onboard locating equipment item, the detecting unit being oriented in a direction in which the aircraft is moving and configured in such a way as to model a vertical terrain avoidance maneuver trajectory undertaken over the forecasting delay from the trajectory followed by the aircraft predicted from flight information delivered by flight equipment of the aircraft, a determining unit configured for determining, based on a trajectory followed by the aircraft, a possible limit point for success of the vertical terrain avoidance maneuver, said trajectory being predefined as a function of the type of the aircraft, and an indications unit configured for giving indications on azimuth clearance sectors, around the direction in which the aircraft is moving, suitable for of the vertical terrain avoidance maneuver, the indication unit linked to the aircraft and configured in such a way as to contain a limit point protection volume and, for different azimuths covered, trajectories of a compound maneuver beginning with change-of-heading maneuvers making it possible to reach an azimuth and continuing with the vertical terrain avoidance maneuver, an estimating unit configured for estimating a free-travel distance in each azimuth clearance sector on a straight distancing trajectory with constant gradient and over a distance corresponding to more than one minute of flight, the free-travel distance being free of potential conflicts with the terrain, and a signaling device configured for signaling azimuth clearance sectors and free-travel distances.

2. The system as claimed in claim 1, wherein the means for estimating free-travel distance determine, on the distancing trajectories, possible limit points for success of the vertical avoidance maneuver marking the limit of a free-travel distance.

3. The system as claimed in claim 1, wherein the estimating unit is configured to determine, on the distancing trajectory, points of initiation of a vertical avoidance maneuver having an arbitrary slope less than a slope of the vertical avoidance maneuver, said points of initiation being taken as a limit of an immediate free-travel distance.

4. The system as claimed in claim 1, wherein the distancing trajectory is a horizontal straight trajectory.

5. The system as claimed in claim 1, wherein the distancing trajectory is a straight trajectory reproducing a slope of a current trajectory of the aircraft.

6. The system as claimed in claim 1, wherein the distancing trajectory is a climbing straight trajectory.

7. The system as claimed in claim 1, wherein the compound maneuver used to generate the protection volume for the determination of the clearance sectors begins with a change-of-heading maneuver including a turn in a horizontal plane.

8. The system as claimed in claim 1, wherein the compound maneuver used to generate the protection volume for the determination of the clearance sectors begins with a change-of-heading maneuver including in a climbing turn.

9. The system as claimed in claim 2, wherein the vertical avoidance maneuver has a trajectory predefined as a function of a type of the aircraft including current climb capabilities.

10. The system as claimed in claim 2, wherein the vertical avoidance maneuver has a trajectory predefined as a function of a type of the aircraft including a current configuration.

11. The system as claimed in claim 1, further comprising a selecting unit configured for selecting at least one compound terrain avoidance maneuver for minimizing a change of route and conflicts with the terrain is approximately 20 seconds of flight time from a current position of the aircraft.

12. The system as claimed in claim 11, further comprising means for displaying the selected compound maneuver or maneuvers.

13. The system as claimed in claim 11, further comprising means for guiding the crew of the aircraft in the execution of a compound terrain avoidance maneuver.

14. The system as claimed in claim 11, further comprising means for automatically executing a compound terrain avoidance maneuver acting directly on the flight equipment of the aircraft.

15. The system as claimed in claim 1, further comprising a warning unit configured for warning of the risk of collision in a medium term with the terrain, likening a collision with the terrain to the penetration of the terrain into a warning protection volume linked to the aircraft that models a predefined vertical avoidance maneuver trajectory undertaken in the medium term, wherein the medium term is approximately 20 seconds of flight time.

16. The system as claimed in claim 1, further comprising a short-term terrain collision risk alarm unit configured for likening a collision in a short term with the terrain to the penetration of the terrain into an alarm protection volume linked to the aircraft that models a predefined standard vertical avoidance maneuver undertaken in the short term, wherein the short term is between about 5 seconds and 8 seconds of flight time.

17. The system as claimed in claim 1, further comprising a medium- and short-term terrain collision risk warning and alarm unit configured for implementing a protection volume for the determination of the clearance sectors and of the warning and alarm protection volumes modeling predefined avoidance maneuver trajectories of different types, the predefined trajectory modeled in the protection volume for the determination of the clearance sectors having a climb slope greater than the predefined avoidance maneuver trajectories modeled in the warning and alarm protection volumes.

* * * * *